(12) United States Patent
Grajcar et al.

(10) Patent No.: US 11,582,851 B2
(45) Date of Patent: Feb. 14, 2023

(54) BENEFICIAL APPLICATIONS OF UVA1 LIGHT

(71) Applicant: SIGNIFY NORTH AMERICA CORPORATION, Somerset, NJ (US)

(72) Inventors: Zdenko Grajcar, Orono, MN (US); Aaron Stephan, Chanhassen, MN (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 46 days.

(21) Appl. No.: 17/052,300

(22) PCT Filed: May 1, 2019

(86) PCT No.: PCT/US2019/030241
§ 371 (c)(1),
(2) Date: Nov. 2, 2020

(87) PCT Pub. No.: WO2019/213291
PCT Pub. Date: Nov. 7, 2019

(65) Prior Publication Data
US 2021/0161099 A1   Jun. 3, 2021

Related U.S. Application Data

(60) Provisional application No. 62/744,983, filed on Oct. 12, 2018, provisional application No. 62/665,949, filed on May 2, 2018.

(51) Int. Cl.
*H05B 47/10* (2020.01)
*H05B 47/16* (2020.01)
(Continued)

(52) U.S. Cl.
CPC ............ *H05B 47/10* (2020.01); *A01K 13/00* (2013.01); *H05B 45/10* (2020.01); *H05B 47/16* (2020.01)

(58) Field of Classification Search
CPC ........ H05B 47/10; H05B 47/16; H05B 45/10; H05B 45/20; A01K 13/00; A01K 63/06; A01K 15/00
See application file for complete search history.

(56) References Cited

U.S. PATENT DOCUMENTS 6,278,135 B1   8/2001   Srivastava et al.
8,651,723 B2   2/2014   Juestel et al.
(Continued)

FOREIGN PATENT DOCUMENTS

CN   107810915 A   3/2018
DE   102005059362 A1   9/2006

*Primary Examiner* — Minh D A (57) ABSTRACT

A light engine that produces UVA1 light, but not UVA2 or UVB radiation, that will provide a human or animal subject a beneficial application of artificial UVA1 light without the deleterious effect of the UVA2 and UVB light. Methods of providing UVA1 light to the human or animal subject over various periods of time provide positive treatments that can reduce stress, reduce anxiety, increase a pain threshold, and induce interferon production. Exposure to UVA1 wavelength light (360-400 nm) provides a positive effect on both humans and animals. This is especially true when the humans or animals do not receive UVB and UVA2 at the time that the UVA1 light is received, and the ratio of UVA1 light to (UVA1 light+visible light) is greater than 10%.

16 Claims, 6 Drawing Sheets

(51) Int. Cl.
*H05B 45/10* (2020.01)
*A01K 13/00* (2006.01)

(56) References Cited

U.S. PATENT DOCUMENTS

| | | |
|---|---|---|
| 10,237,956 B2 | 3/2019 | Grajcar |
| 2015/0216130 A1* | 8/2015 | Grajcar .................. A01G 7/045 47/58.1 LS |
| 2016/0205739 A1* | 7/2016 | Grajcar .................. A01G 7/045 315/210 |
| 2017/0000163 A1* | 1/2017 | Grajcar .................. A01K 45/00 |
| 2017/0259079 A1 | 9/2017 | Grajcar et al. |
| 2017/0290124 A1* | 10/2017 | Grajcar .................. A01K 15/00 |

* cited by examiner

BENEFICIAL APPLICATIONS OF UVA1 LIGHT

CROSS-REFERENCE TO PRIOR APPLICATIONS

This application is the U.S. National Phase application under 35 U.S.C. § 371 of International Application No. PCT/US2019/030241, filed on May 1, 2019, which claims the benefit of U.S. Provisional Patent Application No. 62/665,949, filed on May 2, 2018 and U.S. Provisional Patent Application No. 62/744,983, filed on Oct. 12, 2018. These applications are hereby incorporated by reference herein.

TECHNICAL FIELD

This document pertains generally, but not by way of limitation, to providing specific electromagnetic radiation to humans and animals.

BACKGROUND

The UV radiation or light is designated as a range of the electromagnetic spectrum that covers the wavelengths from 100-400 nanometers) and is divided into three bands: UVA (315-400 nm); UVB (280-315 nm); and UVC (100-280 nm). The UVA band can be further subdivided into UVA1, which is the longer UV wavelengths of 360 to 400 nm, and the shorter-wavelength UVA2 that includes wavelengths of 315 to 360 nm. The sunlight that penetrates the atmosphere and makes it to the ground averages about 5% to 10% UVA light when compared to the visible light, which includes wavelengths of approximately 400 nm to 700 nm.

Agricultural animals such as avian, bovine, equine, porcine, ovine, caprine, and the like respond favorably to UVA light. Aquatic animals, including fish and amphibians, also respond favorably to UVA light. As all these species evolved they experienced UVA light in their natural environment. Today, as commercial farming moves animals indoors, the lights that are used to illuminate the barns, holding areas, or ponds do not emit UVA light or don't emit sufficient UVA light to be effective. These lights include incandescent, high pressure sodium, fluorescent, and LED's. In some areas, in the spirit of animal welfare, farmers have started putting windows in barns to give the animals so-called 'natural' light. However, this light is not natural as the glass panes filters out the majority of the UV light, including the UVA wavelengths.

For humans as well, exposure to natural sunshine is minimized as people spend more time indoors, working in buildings and spending free time inside. While incandescent or fluorescent ultraviolet black lights can provide UVA light indoors they typically emit both UVA1 and UVA2 light.

SUMMARY

Applicants have determined that exposure to UVA1 wavelength light (360-400 nm) has a positive effect on both humans and animals. This is especially true when the humans or animals do not receive UVB and UVA2 at the time that the UVA1 light is received.

Certain species such as avian have tetra-chromatic vision, meaning that they can see lights in the range of 300 nm to 400 nm. Other animal species also can see light below the human limit of 400 nm, thus being able to see light in the UVA range.

Applicants have also determined that UVA light receptor proteins (opsins and other photoacceptors) exhibit extra-retinal expression patterns. Thus, UVA light may be perceived through the skin of human and animal species. For chickens, it is perceived predominantly through the comb, wattle, and earlobe. Applicants believe that direct or indirect modulation of sensory neurons by UVA1 light may contribute to the reduced stress and anxiety, and the increased pain tolerance that animals and humans exhibit. It is also believed that neurotransmitters such as glutamate, serotonin, extracellular ATP or CGRP may contribute to the improvements discussed herein.

Furthermore, Applicants have determined that humans and agricultural animal species exhibit less stress, less anxiety, lower inflammation, lower itch, enhanced immunity, and increased pain thresholds when given regular exposure to UVA1 light. While the typical noon day sun delivers about 5% to 10% UVA1 when compared to the human visible spectrum, in some embodiments that Applicants have found that 12% to 15%, or as much as 20% or 25%, UVA1 in addition to some light in the visible spectrum has a beneficial effect on agricultural animals. UVA1 light alone, or 100% of a ratio of UVA1 to UVA1+visible light, can also have beneficial effects. These benefits can be more fully realized if UVA2 and UVB, which have detrimental effects on animal physiology, are absent.

The light sources discussed herein enhance and improve upon what humans or animals may experience in nature by eliminating the harmful effects of UVA2, UVB and UVC radiation and providing a beneficial application of UVA1 light. For example, in nature, animals experience a sunrise and a sunset. In some animal farming facilities, the lights may be turned on all at once, making the animals go from darkness to bright light in an instant. It is also known that UV light intensity is less at sunrise and sunset as the light that the Earth receives from the sun must travel through more of the atmosphere, compared to when the sun is directly overhead. Thus, animals in the wild receive a more gradual ramp up of UVA light than the ramp up of visible light from sunrise to noon. At sunset, it is the opposite. The intensity of UVA light will decrease more rapidly than the decrease in visible light.

Applicants have also determined that instead of supplying agricultural animals with the full light spectrum, that removing some wavelengths from barn lights provides additional benefit. While this may seem counter-intuitive, most wild animals do not receive full spectrum sunlight as they may spend time in the shade. For example, Applicants have determined that broiler chickens grow faster and have less stress if raised in an environment with mostly green light, some blue light, and minimal red light. The addition of UVA1 to this green-light model showed improved growth and reduced stress and anxiety over green light alone. It is believed that other agricultural animal species may also benefit from the UVA1 and green light combination.

In some embodiments, green light with a wavelength of 490 nm to 580 nm can be used. Preferably, light having a wavelength with one or more peaks in the range of 520 nm to 535 nm is used in additional embodiments. In some embodiments, providing green light with UVA1 light is beneficial to animals as it reduces stress, reduces anxiety, and increases their pain threshold.

In some embodiments, only green light and UVA1 light is provided to humans or animals. Applicants believe that this may be an advantageous mix of light wavelengths for reducing stress and anxiety and increasing pain tolerance.

Each of these non-limiting examples can stand on its own, or can be combined in various permutations or combinations with one or more of the other examples.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

While UV light is generally thought of as being harmful to the body, Applicants believe that UVB is more harmful in the absence of UVA1 spectrum, indicating that UVA1 spectrum light can provide a signal to the body of a human or animal to begin protective measures that will help to keep the UVB damage in check. Thus, treatment of a body with UVA1 light can act as a prophylactic against damage that can be caused by UVA2 or UVB exposure.

The UV region covers an electromagnetic wavelength range of 100-400 nm and is divided into three bands: UVA (315-400 nm); UVB (280-315 nm); and UVC (100-280 nm). The UVA band can be further broken into UVA1 which is the longer UV wavelengths (360 to 400 nm) and the shorter-wavelength UVA2 (315 to 360 nm) and UVB (290 to 315 nm). The therapeutic effect of UVA1 is due to its ability to penetrate into the dermis deeper than UVA2 and UVB, and target cells that reside in or infiltrate the dermis, including dendritic cells, fibroblasts, mast cells, and T and B lymphocytes.

As sunlight passes through the atmosphere, all UVC and approximately 90% of UVB radiation is absorbed by ozone, water vapor, oxygen, and carbon dioxide. UVA radiation is less affected by the atmosphere. Therefore, the UV radiation reaching the Earth's surface is largely composed of UVA with a small UVB component. Natural UV radiation varies with time of day and time of year, with maximum levels occurring when the sun is at its maximum elevation, at around midday (solar noon) during the summer months.

Applicants have found that the effect of UVA1, UVA2, and UVB on the human body are different from one another. While UVA2 and UVB act to inflame tissue and act as an immunosuppressant, UVA1 is just the opposite—it acts as an anti-inflammatory agent and as an immunostimulant. It can be viewed that UVA1 acts as a signal to the skin to enact anti-inflammatory and photoprotective mechanisms, preparing the skin and other parts of the body for the harmful effects of UVA2 and UVB.

This disclosure is directed to both photoreceptors and photoreceptors. A photoreceptor can be defined as a signaling molecule. The photoreceptor senses or receives light and transduces a signal to downstream signaling pathways. A photoacceptor can be defined as a molecule that absorbs light and the light absorption affects the molecule's own function.

Urocanic acid (UCA) is a naturally occurring skin substance. It is known that trans-UCA can be photoisomerized to cis-UCA by UV radiation, thus acting as a natural sunscreen. However, it has been shown that cis-UCA is a mediator of the immunosuppressive effects of UV radiation. Light in the UVA1 range, especially in the 360-400 nm range, does not cause this negative effect.

The skin is the largest organ of the human body. In addition to covering the body, the skin plays an important role in protecting the body. Keratinocytes are the predominant cell type in the epidermis, the outermost layer of the skin, constituting 90% of the cells found there. Keratinocytes found in the basal layer (stratum basale) of the skin are sometimes referred to as "basal cells" or "basal keratinocytes". The primary function of keratinocytes is the formation of a barrier against environmental damage by pathogenic bacteria, fungi, parasites, viruses, heat, UV radiation and water loss. Besides the creation of a highly effective physical barrier, keratinocytes also accumulate melanin pigments as they mature, and epidermal melanin functions to potently block UV penetration into the skin. Although melanin may be found in abundance in epidermal keratinocytes, it is not manufactured in these cells. Rather, melanin synthesis is restricted to melanocytes, which are derived from neural crest and are the second most abundant cell in the epidermis. Melanin exists in two main chemical forms: (1) eumelanin, a dark pigment expressed abundantly in the skin of heavily pigmented individuals, and (2) pheomelanin, a light-colored sulfated pigment resulting from incorporation of cysteines into melanin precursors. Eumelanin is much more efficient at blocking UV photons than pheomelanin, thus the more eumelanin in the skin, the less UV-permeable is the epidermis. Fair-skinned people who are almost always UV-sensitive and have high risk of skin cancer have little epidermal eumelanin and therefore realize much more UV effects than darker-skinned individuals. Therefore, the fairer the skin, the more damaging UV exposure will be. In fact, pheomelanin levels are similar between dark-skinned and light-skinned individuals, and it is the amount of epidermal eumelanin that determines skin complexion, UV sensitivity, and cancer risk. Applicants believe that the UV sensitivities of individuals with differing amounts of melanin subtypes will be different.

Keratinocytes contain proteins that are photoreceptors. When exposed to UV light, these photoreceptors change conformation and initiate downstream signal transduction cascades, which can result in the release of neurotransmitters which modulate the nervous system and control the circadian rhythm. The receptors in the skin for heat, pressure, and pain all are connected to the central nervous system. Exposing the skin to UVA1 light on a regular basis is thought to desensitize these receptors to noxious stimuli. This process is analogous to when a person builds muscles by working out. When a person works out on a regular basis and then partakes in an activity that stresses the muscles, the person will feel less pain than a person who does not work out because the muscles and the receptors associated with the muscles are used to the higher level of pain (exertion).

Applicants have determined that UVA1 preconditions the body for the harmful effects of UVA2 and UVB. Thus, according to this embodiment, a light engine that produces UVA1 but not UVA2 or UVB will give the human or animal subject the UVA1 benefit without the deleterious effect of the UVA2 and UVB light. As described above, subjects that receive minimal UVA1 light are not conditioning or exercising their body's system in preparation for UVA2 or UVB exposure. Living bodies expect a certain amount of UVA1 light. If the subject does not receive the required amount, their systems are weaker and more susceptible to pain and inflammation. According to an example embodiment of the present invention, exposing humans or animals to UVA1 in the absence of UVA2 and UVB will condition the receptors in the skin so that the treated human or animal will experience immune-stimulation, a higher pain threshold, and less body inflammation (have enhanced anti-inflammatory agents).

Figure 1:
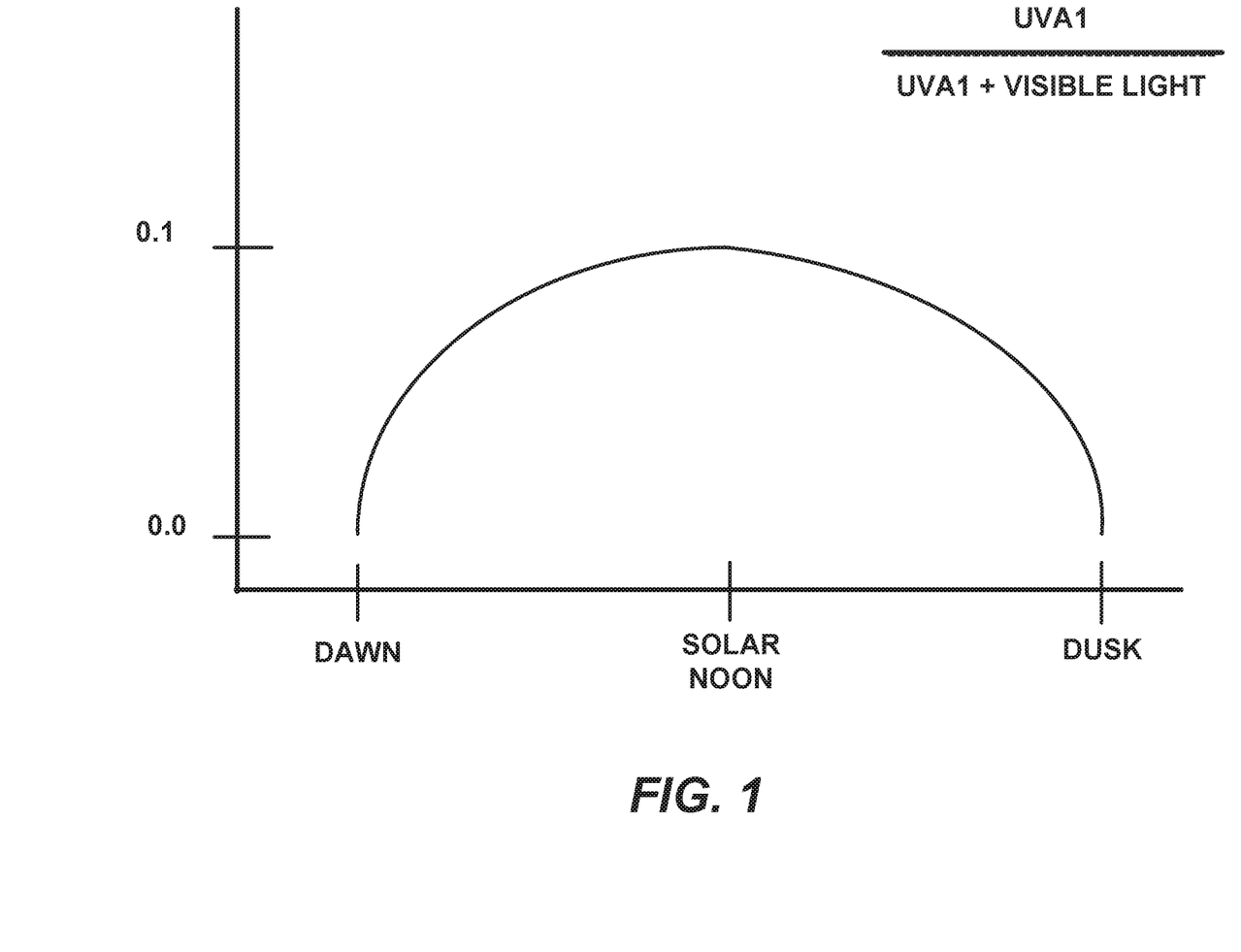
FIG. 1 depicts a graph showing the relative intensity of natural visible light and UVA1 light during a typical day.

In nature, longer electromagnetic wavelengths travel through the Earth's atmosphere more readily than shorter electromagnetic wavelengths. For example, sunrise and sunset skies are red as that is the longest wavelength of the visible spectrum. Considering a ratio of UVA1/(UVA1+UVA2+UVB), the ratio will start near one at sunrise, decrease to a minimum at the solar noon, and then increase to near one prior to sunset. Of course, the amount of all the UV wavelengths is the lowest at sunrise, increases to a maximum near the solar noon, and then decreases as sunset nears. On an average, sunny, noon-time day, the energy flux density, in Watts per square meter ($W/m^2$), of UVA1 is approximately 39.0 $W/m^2$, visible light is approximately 376.0 $W/m^2$, UVA2 is approximately 22.1 $W/m^2$, UVB is 0.78 $W/m^2$. Thus, the natural ratio of UVA1/(UVA1+UVA2+UVB+UVC) is typically no more than 0.63, and a natural ratio of UVA1/(UVA1+Visible light) is typically less than 0.095. FIG. 1 depicts a graph of this ratio of UVA1 to UVA1+visible light. Applicants have determined that exposure to UVA1, in ratios greater than those occurring from natural sunlight, provide beneficial effects to humans and animals.

Figure 2:
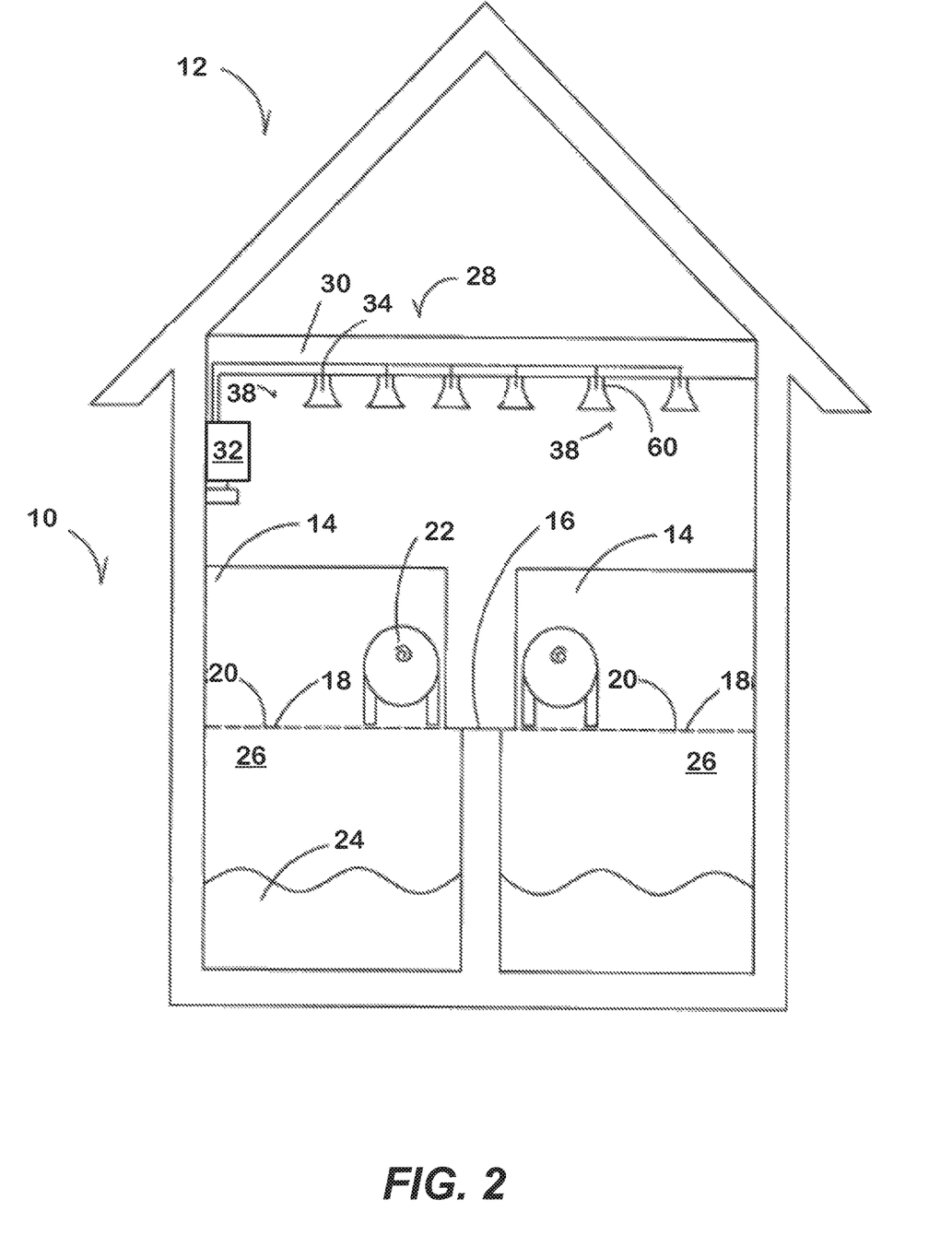
FIG. 2 depicts a cutaway side plan view of a dwelling for livestock.

FIG. 2 depicts an agricultural facility, such as a swine facility 10 that includes a dwelling 12 such as a barn or hog containment facility. The dwelling 12 has a plurality of containment units 14 such as pens, stalls and the like that house animals 22 such as swine, or in an alternative embodiment avian. The floor 16 of the containment units 14 consist of a plurality of slat elements 18 that sit in paralleled spaced relation to one another to form a plurality of openings 20 between consecutive slat elements 18. During wash down of the containment units 16 the feces is sprayed with pressurized water, and the water and feces 24 go through the openings 20 and into a reservoir 26 beneath the floor 16.

Dwelling 12 includes a lighting system 28 that in one example includes a plurality of electrical conduit bodies 30 that receive and electrical input from an electrical source 32. The electrical conduit bodies 30 house wiring 34 that extend to provide an electric excitation signal to different areas in the dwelling. In one example, the wiring is electrically connected to a socket 60 to receive a lighting engine 38. The light engine 38 can include more or more light emitting elements, such as LEDs that can direct light having one or more wavelengths onto the animals 22.

Figure 3:
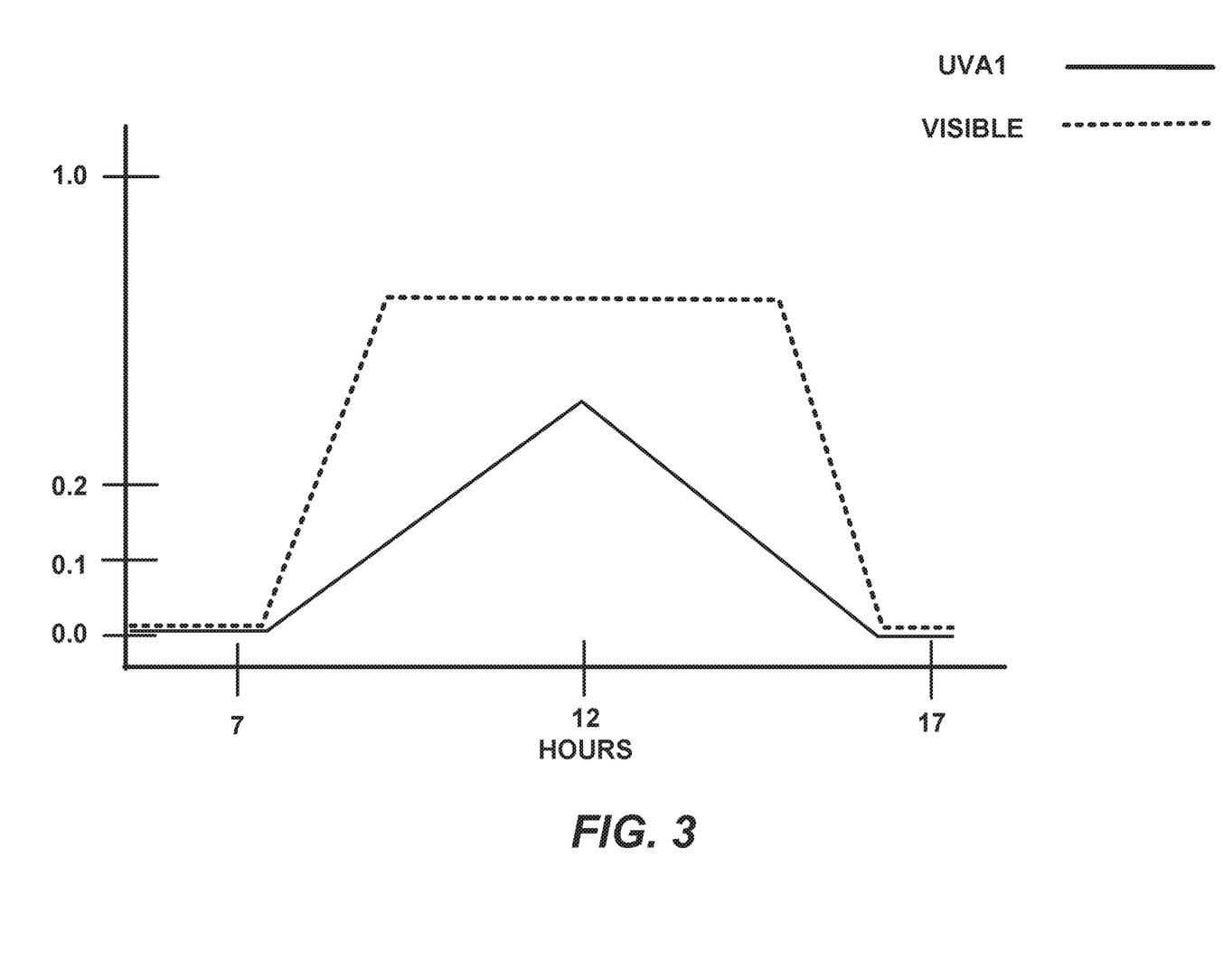
FIG. 3 depicts a graph showing the relative intensity of UVA1 light and a visible light provided by an example lighting engine over a period of hours.
Figure 4:
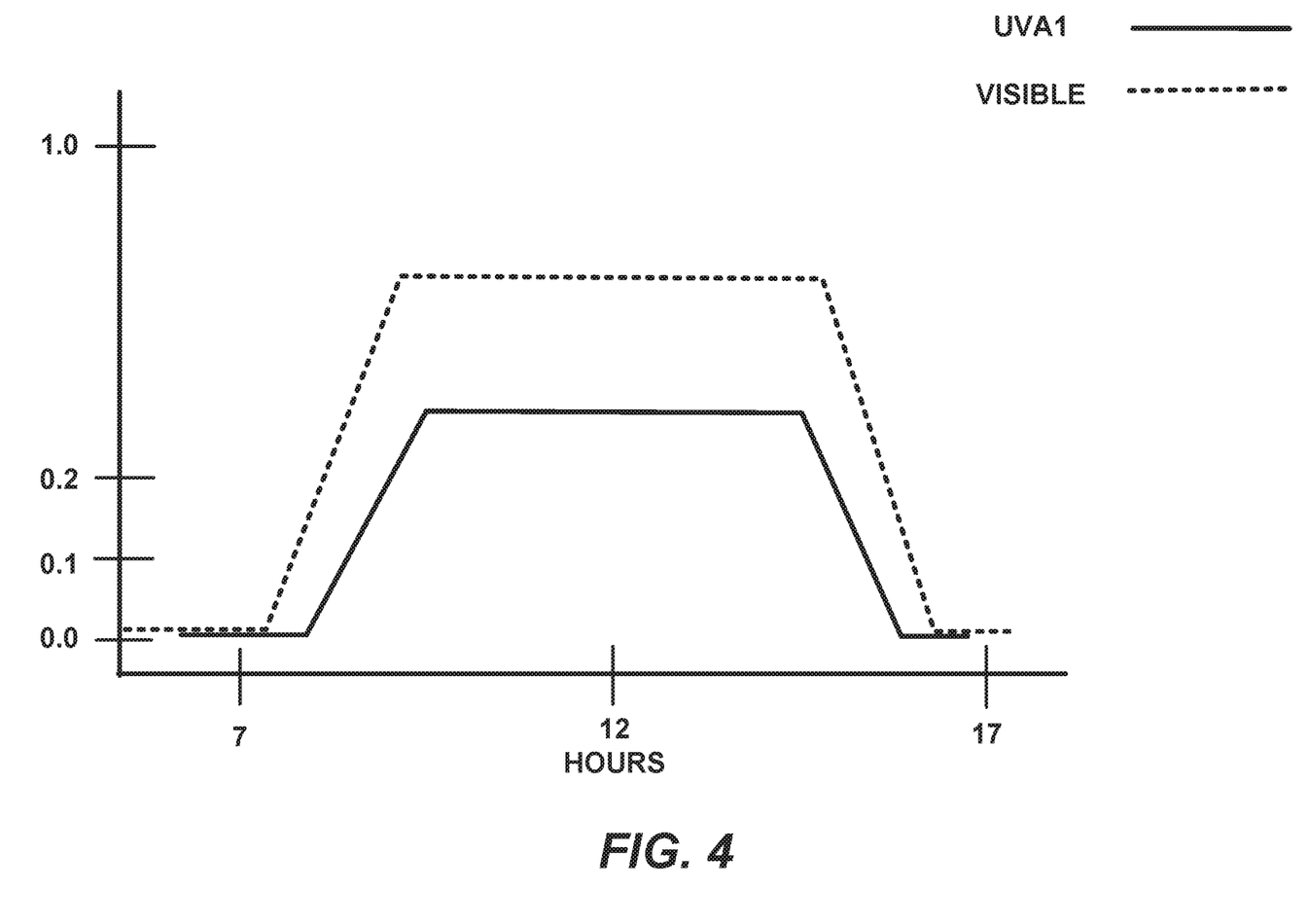
FIG. 4 depicts a graph showing the relative intensity of UVA1 light and a visible light provided by an example lighting engine over a period of hours.

In one example embodiment of the present invention, light engines for indoor commercial, residential, and agricultural use are proposed. These light engines will be controlled by the local time such that UVA1, but not UVA2 or UVB, is provided in an indoor environment. The amount of UVA1 light produced by the light engine can correspond to the changing level of UVA1 light provided naturally. That is, low in the morning, a maximum near the solar noon, and low in the evening, as depicted in FIG. 3. While this is described based on the typical day, this changing amount of UVA1 can correspond to the subject's work day. For example, for people who work an overnight shift, say from 10 pm to 6 am, the amount of UVA1 will reach a maximum between 10 pm and 1 am, depending upon the sleep cycle of a person. Since UVA light affects the human and animal circadian rhythm, in one embodiment of the invention, the amount of UVA1 light produced by the light engine will track. the 'day' of the subject, that is the portion of a 24-hour period where the subject is most active. In some embodiments, the UVA1 or green light, or a combination of UVA1 and green light, are provided in a circadian fashion. To determine the circadian cycle, the greatest intensity of the UVA1 light will occur between the 'morning' and 'mid-day' of the human or animal wake cycle. For example, and assuming eight hours of night or rest time, if a subject wakes at 6:00 a.m. and has a rest or sleep start time of 10:00 pm, the peak intensity for UVA1 for a subject will occur between 12:00 noon and 2:00 pm. A minimal amount of UVA1 light will be provided at wake time up to the peak, and then the amount of UVA1 light will decrease as night or rest time approaches. In some embodiments of this example, the subject will receive minimal or no UVA1 light for three to four hours prior to the night or rest time. As depicted in FIG. 4, amount of UVA1 light produced by the light engine can be ramped up to a desired level or ratio to visible light in an environment, preferably greater than 10%, and maintained during the course of a day-time period, and then ramped down as the intensity of visible light is reduced at the end of the active day-time period.

Applicants have found that serum levels of Interferons are elevated in response to UVA1 exposure. In addition, interferon-induced genes are also up-regulated. Interferons are cell signaling proteins that are released in response to infections. Underproduction of interferons can lead to the development of Multiple Sclerosis, and treatment of this disease can include administration of interferon drugs. Interferon therapy can also be used to treat a range of cancers, hepatitis C, and herpes simplex viral infections. UVA1 light can be provided to increase the presence of interferons in a subject.

Most commercial, agricultural, and residential lights in use today do not produce an appreciable amount of UV light. Most commercial, agricultural, and residential glass (windows) filter out the vast majority of UV light. Thus, a person who spends minimal time outside does not receive beneficial UVA1 light. Similarly, in commercial agricultural systems, animals are generally raised indoors with minimal or no exposure to non-glass filtered light. In these circumstances, the lights described herein provide the beneficial and needed UVA1 light. In winter months, people who work the day shift indoors will generally receive minimal UV light. They may go to work while it is dark, work either under a roof or behind glass, and then drive home in the dark. The result of this can be seen with how a person is affected by temperature. In the summer, when a person likely is exposed to more UVA radiation, 68° F. will feel comfortable. In the winter, when a person is exposed to substantially less UVA. radiation, 68° F. will feel uncomfortable, with the person feeling cold. This is due to the lack of activation of the skin photoreceptors. Without this activation, the receptors are less conditioned and will be more susceptible to temperature or pain stimulation.

Applicants have found that many neurological diseases, including, for example, migraines and fibromyalgia, can be treated with embodiments of the disclosed invention. It is believed that conditioning the receptors in the body, as described herein, will increase a subject's pain threshold and have an anti-inflammatory analgesic effect.

Calcitonin Gene-Related Peptide (CGRP) is a molecule in the brain and nervous system involved in the transmission of pain and the resultant reaction of tissues and blood vessels. To control pain from migraines and other neurological diseases, companies are investigating medications such as monoclonal antibodies that interfere with either the CGRP molecule itself or the receptors where CGRP binds. Antibodies are proteins that counter or interfere with very specific parts of another protein or the locations where a protein is supposed to bind to the receptor. In the case of the monoclonal antibodies to CGRP, or CORP antagonists, antibodies have been created that when administered to an individual with migraine will block the receptor sites on blood vessels or attach to CGRP itself so that it cannot fit into the receptor sites and thus interferes with the series of events that leads to migraine.

Other pain neurotransmitters are similarly affected. Substance P, a compound thought to be involved in the synaptic transmission of pain and other nerve impulses, is a polypeptide with eleven amino-acid residues. Glutamate is an amino acid, acting as a neurotransmitter and as a neuromodulator. Glutamate refers to the anion of glutamic acid in its role as a neurotransmitter: a chemical that nerve cells use to send signals to other cells. It is by a wide margin the most abundant neurotransmitter in the vertebrate nervous system. Gamma-Amino Butyric acid (GABA) is an amino acid which acts as a neurotransmitter in the central nervous system. It inhibits nerve transmission in the brain, calming nervous activity.

Through use of embodiments of the inventions described herein, a similar result can be obtained. When exposed to UVA1, the keratinocytes in the skin release neural transmitters that attach to the same receptors as CGRP. When the UVA1 neurotransmitters are present, the CRGP cannot attach to the receptor. This will result in a disruption of the migraine and fibromyalgia process.

In addition to keratinocytes, other epidermal cells may also play a role. Melanocytes are melanin-producing neural crest-derived cells located in the bottom layer (the stratum basale) of the skin's epidermis, the middle layer of the eye (the uvea), the inner ear, vaginal epithelium, meninges, bones, and heart. Melanin is a dark pigment primarily responsible for skin color. Langerhans cells are members of the dendritic cells family, residing in the basal and suprabasal layers of the epidermis and in the epithelia of the respiratory, digestive and urogenital tracts. They specialize in antigen presentation and belong to the skin immune system. Merkel cells, also known as Merkel-Ranvier cells or tactile epithelial cells, are oval-shaped mechanoreceptors essential for light touch sensation and found in the skin of vertebrates.

Some studies have shown that migraines affect more females than males, and generally from the age of 20 to 50. One possible reason for this is that the male body has more testosterone than the female body. Testosterone competes for the similar type of receptors in the skin as pain neurotransmitters do. As with UVA1, if the receptors are occupied or 'busy' with testosterone, a subject will have a higher pain threshold as the pain signals will have a harder time reaching the nervous system.

Some studies have shown that Fibromyalgia is more prevalent in lower skin color type people. The Fitzpatrick scale is a numerical classification schema for human skin color. It was developed in 1975 by Thomas B. Fitzpatrick to estimate the response of different types of skin to UV light. The Fitzpatrick scale remains a recognized tool for dermatological research into human skin pigmentation. UVA radiation is what makes people tan. UVA rays penetrate to the lower layers of the epidermis, where they trigger cells called melanocytes to produce melanin. Melanin is the brown pigment that causes tanning. Melanin is the body's way of protecting skin from burning. People with lower skin color types do not tan, but rather just burn. Applicants believe that increased levels of melanin attenuate UVA1 effects due to effective UVA absorption ("filtering").

In some embodiments, Applicants supply both UVA1 and green light to humans or agricultural animals. It is known that many opsins are bistable—that is they have two stable states. When the UVA1 light acts on an opsin, the opsin is transformed to a new conformation and the new conformation sends a signal to the nervous system. When this new conformation is acted on by green light, it is changed back to the original opsin. This activating and resetting cycle enhances the effectiveness of the UVA1 treatment.

For agricultural animals such as avian species, supplementing the light they receive with UVA1 can result in increased production performance. As stress is decreased, broiler birds exposed to UVA light will be calmer and less stressed than birds that do not receive UVA. This calm, less-stress environment results in faster growth and increased feed conversion.

For animals such as swine, bovine, and equine, supplementing the light they receive with UVA1 can result in animals that experience less stress and less inflammation. This too will result in increased production performance. Animals that are subject to lower levels of stress will grow faster and be healthier.

Currently, in some swine facilities, the Applicant's DIM-TO-CALM™ technology, as described in U.S. Pat. No. 10,237,956, which is hereby incorporated by reference in its entirety, is used in sow barns, gestation buildings, nurseries, gilt development units and finishing facilities. These lights allow the lighting fixture to fully dim red, which swine perceive as darkness. During the day hours, white light is ramped up (to mimic a sunrise), is on during the day time, and then ramped down for night. In some embodiments of this invention, UVA1 light can be added to the light emitted during the day-time hours.

Currently, in some avian broiler (avian species raised for meat) facilities, green and red light are used during the brooding period—typically the first week of life post-hatch. After this, green light with no or minimal red light, such as the Applicant's lights designed with JUNGLITE GREEN™ technology, are used, This technology includes utilizing LEDs for the purpose of simulating chlorophyll-filtered sunlight. Chlorophyll preferentially absorbs blue and red light, thus the light that illuminates the jungle floor has an enrichment of green spectrum. The light would be classified as "white", since it has some amount of blue, green, and red light, but tends to have higher fraction of green light. These green biased lighting elements include two LED chip types: JUNGLITE GREEN™ and red. As the lights dim down, the red is pulled out, leaving only the JUNGLITE GREEN™.

The JUNGLITE GREEN™ spectrum includes a blue (460 nm peak) plus a wider green peak (centered around 530 nm). In some embodiments of this invention, UVA1 light can be added to the green light of JUNGLITE GREEN™ during the day-light hours.

The light engines described herein are preferably include light emitting diodes (LEDs) but can be made of any type of light, including incandescent, fluorescent, and the like, however, LEDs are a preferred embodiment. For some embodiments, a light engine will contain both white light and UVA1 light emitting LEDs. In some embodiments, the light engine will contain both green light and UVA1 emitting LEDs. In some embodiments, a LED with a spectral maximum at 380 nm is preferred for the UVA1 emitting LED alone or in conjunction with other visible light emitting LEDs. In some embodiments, the light engines will include a controller or dimmer which will control the amount of white, UVA1, or green light that is emitted by the light engine. In some embodiments, the controller or dimmer will be controlled by or include a clock so that the white, UVA1, or green light can be varied according to a timed schedule.

In some embodiments, the light engines described herein will be in the form or overhead residential, agricultural, or commercial lights. In some embodiments, a light emitting fabric can be used to deliver the desired light to a subject. In some embodiments, a light emitted face mask or other apparatus that provides light to a certain part of the subject's body can be used.

Figure 5:
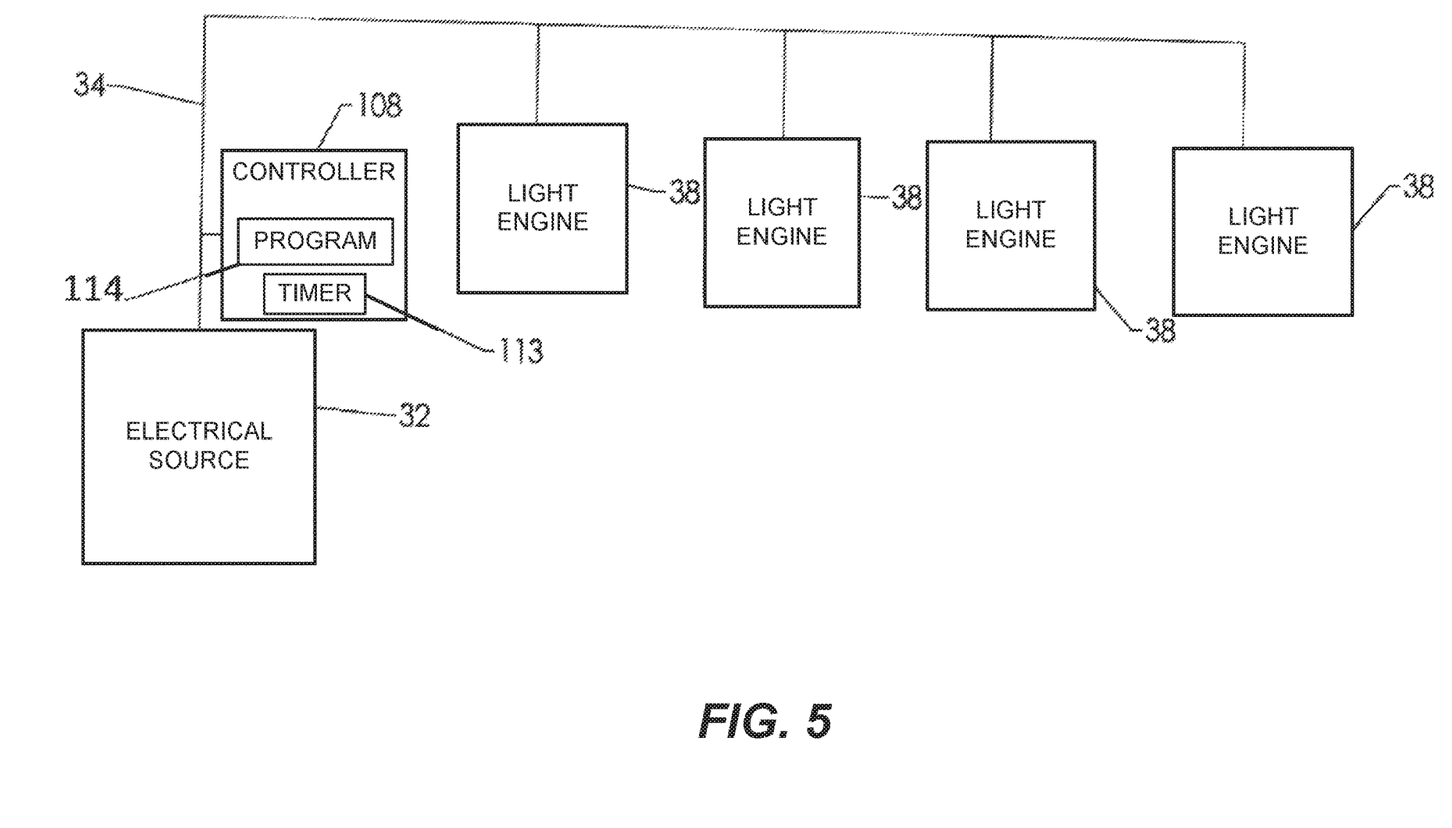
FIG. 5 is a schematic diagram of electric components for a lighting assembly for a dwelling for livestock.
Figure 6:
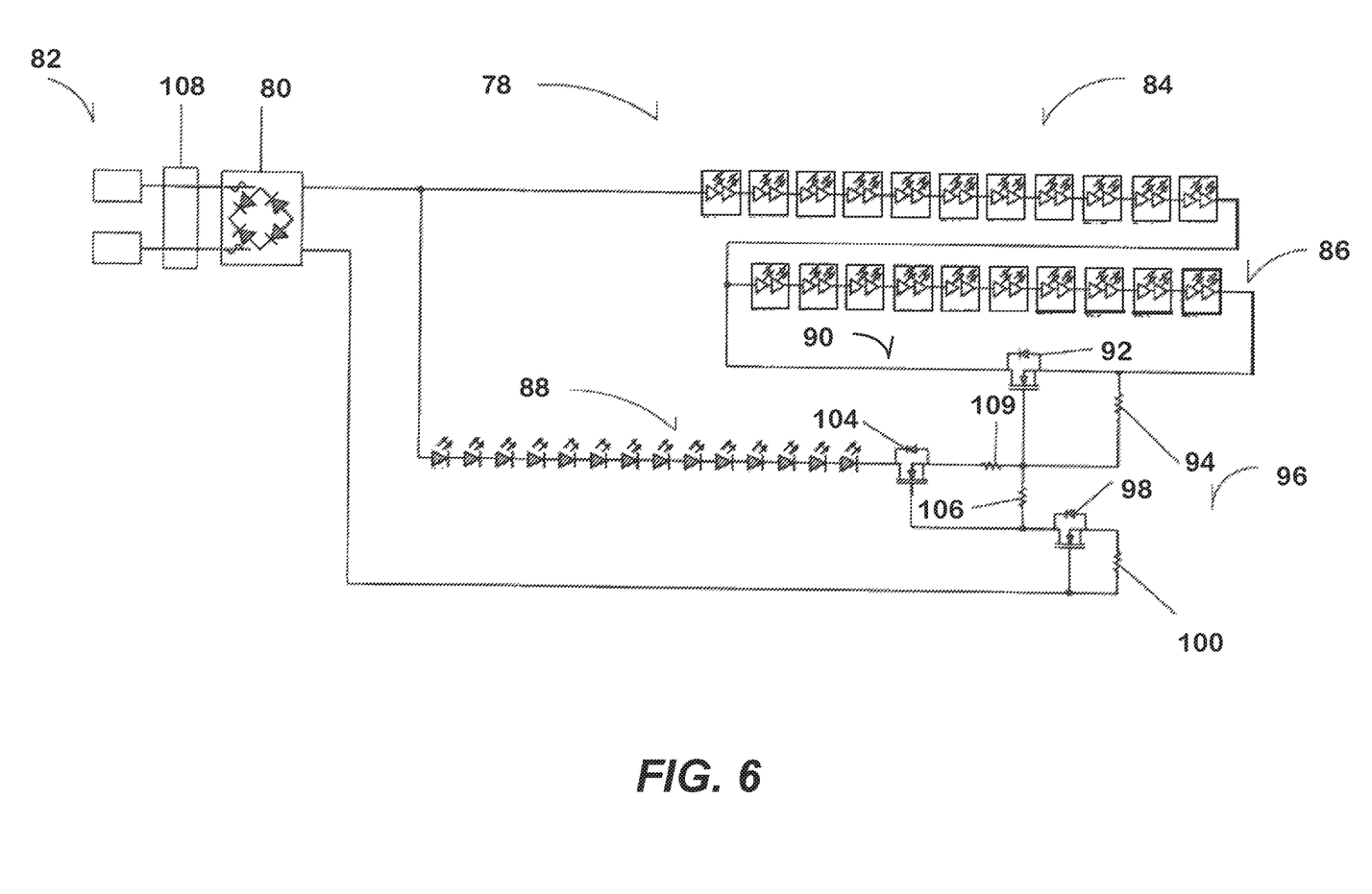
FIG. 6 is a schematic diagram of a lighting system for a dwelling for livestock.

FIG. 5 depicts a plurality of light engine 38 are installed into a facility 10 and electrically connected to a controller 108 having a programmable timer 113. The light engine 38 can be connected within the facility 10 either directly or can be attached to provide a retro fit if needed instead of a hard-wired connection. In this manner the light engine 38 can be modular in design.

The programmable timer 113 can then be programmed to provide varying lighting colors and intensities in the facility 10 over a period of time. As the day begins UVA1 light, alone or in combination with a visible spectrum of light such as green or white light, can be emitted at a first intensity that can gradually be increased over a period of time, such as four to eight hours, and then gradually decreased over a second period of time until the UVA1 and optionally the visible light is not emitted.

Alternatively, the programmable timer 113 can be adjusted so that more or less light is provided throughout a day to provide a beneficial dosage of UVA1 light. In this manner the productivity of the animal is manipulated enhancing growth, reducing stress or anxiety, or other beneficial behavior. Thus, the lighting assembly 38 is used to manipulate both psychological and physiological characteristics of the animal to optimize growth, breeding and production of the animal.

In one embodiment the first group of light emitting diodes 84 is a first predetermined wavelength that in one embodiment is full spectrum white; the second group of light emitting diodes 86 is a second predetermined wavelength that in one embodiment is blue and in another embodiment UV or less than 400 nm; and the third group of light emitting diodes 88 is a third predetermined wavelength that in one embodiment is red. In this embodiment, a program 114 is either installed into or with the controller 108 to be in communication with the tinier 113 and the controller 108 to activate the light engines 38.

FIG. 7 depicts circuitry 78 that can include a rectifying device 80 that receives current from an AC source 82 and includes a first group of light emitting diodes 84 arranged in series with a second group of light emitting diodes 86, both of which comprise diodes emitting white light, green light, or a composite white light. A third group of light emitting diodes 88 comprising diodes emitting UVA1 light are presented in parallel to the first and second groups of diodes 84 and 86. UVA1 light emitted is considered a light having a wavelength approximately between 340 nanometers (nm) and 400 nm. The threshold voltage of the third group of light emitting diodes 88 in one embodiment is set lower than the threshold voltage of the first group of light emitting diodes 84 such that the third group of light emitting diodes 88 turn on first as voltage is increased.

A bypass path 90 is presented with a first impedance element 92, that in one embodiment is a transistor. In an example embodiment the first impedance element 92 is a depletion MOSFET, though a p-channel MOSFET, n-channel MOSFET or the like can be used without falling outside the scope of this disclosure, even if an additional transistor is required for functionality purposes. A first resistor 94 is also provided to control the flow of current through the first impedance element 92 to provide smooth and continuous current flow.

A current path 96 is also provided with a second impedance element 98 that similarly in one embodiment is a depletion MOSFET. Similar to the bypass path 90 the current path 96 utilizes a second resistor 100 again to control the impedance element 98. Similarly, a current path 102 is provided between the third group of light emitting diodes 88 and first and second groups of light emitting diodes 84 and 86. Again, this current path 102 utilizes a third impedance element 104 and third resistor 106 to provide similar functionality as the other bypass paths. In particular, this third impedance element 104 acts as a switch to stop the flow of current through the third group of light emitting diodes 88 to eliminate the wavelength of light, such as red emitted by the third group of light emitting diodes 88.

When a controller 108 is electrically connected to the circuit and the voltage begins dropping, current flow to the second group of diodes 86 drops before the first group of light emitting diodes 84, dimming out a group of white diodes. Then as dimming continues and a threshold current is reached the first group of light emitting diodes 84 begin to dim. Thus, again white light is slowly dimmed and eliminated from the output light. In this manner only the third group of light emitting diodes 88 that emit UVA1 remain providing light. A supplemental resistor 109 optionally is provided to limit current in the system and to improve efficiencies.

Therefore, the light engine can dim to produce a UVA1 light. Consequently, with a programmable dimming device the lighting assembly 38 can provide a combination of White or green light and UVA1 light throughout a 24-hour period to optimize animal performance (e.g., growth).

Visible red light is more readily absorbed by water than other visible wavelengths. Light with longer wavelengths is absorbed more quickly than that with shorter wavelengths. Because of this, the higher energy light with short wavelengths, such as blue, violet, and UV, are able to penetrate more deeply. At 40 m, saltwater has absorbed nearly all the red visible light, yet blue and UV light is still able to penetrate beyond these depths. The depth of the water not only affects the colors of light that are noticeable underwater, it also affects the intensity, or amount of light. Within the first 10 m, water absorbs more than 50 percent of the visible light energy.

It is known that some species of fish can see UV light. Because of this ultraviolet vision, fish able to see objects more either by reflection or silhouettes, even in deep water. Some researchers have stated that it has been estimated that there is sufficient ultraviolet light for vision down to 200 meters (700 feet) in clear ocean water. Thus, for fish, UVA1 light is a natural part of their desired light spectrum. Applicants have determined that indoor raised fish show improved growth and response when they are exposed to UVA1 light. In some embodiments, a light engine as described herein can be utilized to provide UVA1 light, alone or in combination with visible light, to an aquatic environment.

The claimed invention is:

1. A light engine comprising;
   a light emitter that emits a UVA1 light having a wavelength in a first range of 360 nanometers (nm) to 400 nm;
   a light element that emits green light having a wavelength in the range of 490 nm to 580 nm; and
   a controller coupled to the light emitter and the light element, the controller configured to control the duration and intensity of UVA light emitted by the light emitter and the duration and intensity of the green light emitted by the light element,
   wherein the UVA1 light is at least 10% of a total light output from the light engine, and an amount of UVA1 light and green light emitted is at least 75% of a spectral output of the light engine.

2. The light engine of claim 1, wherein the emission of the visible light by the light element and the emission of the UVA1 light by the light emitter is controlled independently by the controller.

3. The light engine of claim 1, wherein the light element and the light emitter are light emitting diodes (LEDs).

4. The light engine of claim 3, wherein the green light is in a fourth range of 520 nm to 540 nm.

5. The light engine of claim 3, wherein the amount of UVA1 and green light emitted is at least 90% of the spectral output of the light engine.

6. The light engine of claim 1, wherein the emitted UVA1 light and visible light is substantially free of light having wavelengths in the UVC, UVB and UVA2 ranges.

7. The light engine of claim 6, wherein a ratio of the UVA1 light over a sum of UVC, UVB and UVA2 light emitted by the light engine is greater than 95%.

8. The light engine of claim 1, wherein the total light output from the light engine is substantially free of UVC, UVB and UVA2 light.

9. The light engine of claim 1, wherein a ratio of the UVA1 light over a sum of a total of UVC, UVB and UVA2 light emitted by the light engine in the total light output is greater than 95%.

10. A method of reducing stress and anxiety in animals comprising:
    providing the animals with a green light having a wavelength in the range of 490 nm to 580 nm, and
    providing UVA1 light that is at least 10% of the sum of the green light plus the UVA1 light, and an amount of UVA1 light and green light emitted is at least 75% of a spectral output to the animals.

11. The method of claim 10 wherein the visible light is provided to the animals for a first period of time every day, and the UVA1 light is provided to the animals for a second period of time every day.

12. The method of claim 10 wherein the first period of time is longer than the second period of time.

13. A method of providing light to agricultural animals comprising:
    providing a green light having a wavelength in the range of 490 nm to 580 nm to the agricultural animals;
    providing, with a light engine coupled to a controller, an increasing amount of UVA1 light to the animals during a time when the green light is provided to the agricultural animals, the UVA1 light having a wavelength in a range of 360 nanometers nm to 400 nm,
    wherein the amount of UVA1 light is increased from 0% to up to at least 10% of the sum of the green light plus the UVA1 light, and an amount of UVA1 light and green light emitted is at least 75% of a spectral output of the light engine.

14. The method of claim 13 wherein the green light has a wavelength in the range of 520 nm to 540 nm.

15. The method of claim 13, wherein the light engine provides the green light and wherein the controller is configured to set the green light and to set the UVA1 light such that the UVA1 light is at least 10% of a total light output, which includes the green light.

16. The method of claim 15, wherein the total light output from the light engine is substantially free of UVC, UVB and UVA2 light.

* * * * *